INVENTOR.
ALVIN W. ELSTON
GORDON A. VINCENT
BY
Roger W. Jensen
ATTORNEY.

March 15, 1966　　A. W. ELSTON ETAL　　3,241,099
PRESSURE COMPENSATED TRANSDUCER
Filed Dec. 1, 1961　　2 Sheets-Sheet 2

*INVENTOR.*
ALVIN W. ELSTON
GORDON A. VINCENT
BY
ATTORNEY.

United States Patent Office 3,241,099
Patented Mar. 15, 1966

3,241,099
PRESSURE COMPENSATED TRANSDUCER
Alvin W. Elston and Gordon A. Vincent, Seattle, Wash., assignors to Honeywell Inc., a corporation of Delaware
Filed Dec. 1, 1961, Ser. No. 156,409
10 Claims. (Cl. 340—10)

This invention pertains to improvements in electromechanical transducers and more particularly to an improved bender type transducer.

The transducer of this invention finds particular use in situations where it will be used at various ocean depths and for this reason is particularly well suited for use on submarines or similar applications.

The invention comprises a plurality of pairs of radiating means mounted inside of a transducer housing, each radiating means having a vibrating member. Each pair of radiating means is mounted in a substantially parallel spaced apart relationship by means of common end supports connected to the ends of the vibrating members. The pairs of radiating means are stacked inside the transducer housing, so as to form spaced apart first and second radiating surfaces.

A free flooding chamber is positioned in the space between the first and second radiating surfaces. The remainder of the space inside the transducer is filled with a liquid such as silicon oil. The free flooding chamber acts to equalize the internal pressure of the transducer with the external pressure of the surrounding ocean, thereby preventing deformation of the transducer as the external pressure is varied due to changes in transducer depth. However, the free flooding chamber creates a problem in that a vibrating bar exposed to water on both sides represents a nonradiating dipole. An acoustic dipole is two point sources separated in space. If this separation is small compared to a wave length of sound in water, there will be no directionality to the dipole. If both sources are radiating in phase, at the same frequency, the dipole becomes merely a simple monopole source. However, if the sources are 180° out of phase the two waves cancel and no radiation is possible.

The present invention solves the problem of cancellation of the transducer radiation. The present invention provides a compliant means in the space between the radiating surfaces which functions to relieve any pressure variations tending to occur on the inner faces of the radiating surfaces. In the preferred embodiment of this invention a plurality of compliant gas filled tubes are placed in the free flooding chamber very close to the inner faces of the radiating surfaces. In this near field, pressure cannot build up in the water because the tubes immediately relieve this pressure. The system now acts as a monopole radiator. If only partial pressure relief is achieved, some cancellation will occur and, as a result, more total motion is required from the transducer to radiate a given power.

For this reason it is important that a high degree of pressure relief is accomplished. As hydrostatic pressure is increased, the tubes compress and become stiffer. It is necessary for the tubes to still remain compliant at lower depths compared to the mechanical compliance of the radiating surfaces. If not, the resonant frequency of the transducer increases.

In prior art transducers, suppression of out-of-phase back radiation from the inner surfaces of the bender elements as well as pressure variations resulting from temperature changes, were compensated for by the use of oil or air reservoirs and required the need for high pressure air bottles, compressors, regulators, and air lines to the surface. In the present invention the need for this auxiliary equipment has been eliminated by the use of the complaint tubes.

It is one object of our invention, therefore, to provide an improved bender type transducer.

Another object of our invention is to provide a bender type transducer wherein complaint tubes are used to relieve pressure changes on one side of the radiating surfaces.

These and other objects of our invention will become apparent to those skilled in the art upon consideration of the accompanying specification, claims and drawing of which:

Figure 1:
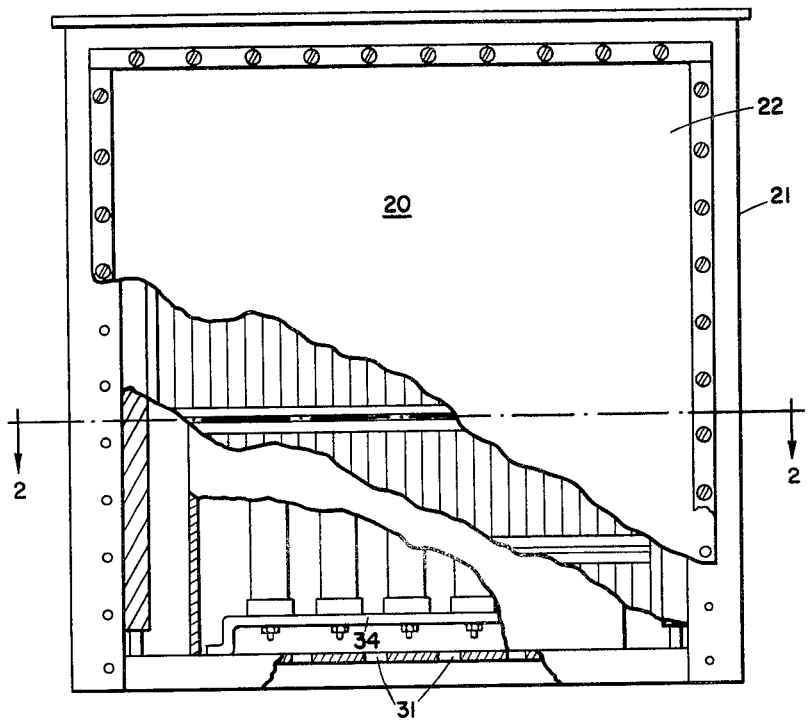
FIGURE 1 is a cutaway view of the transducer showing the radiating surfaces and the complaint tubes.
Figure 2:
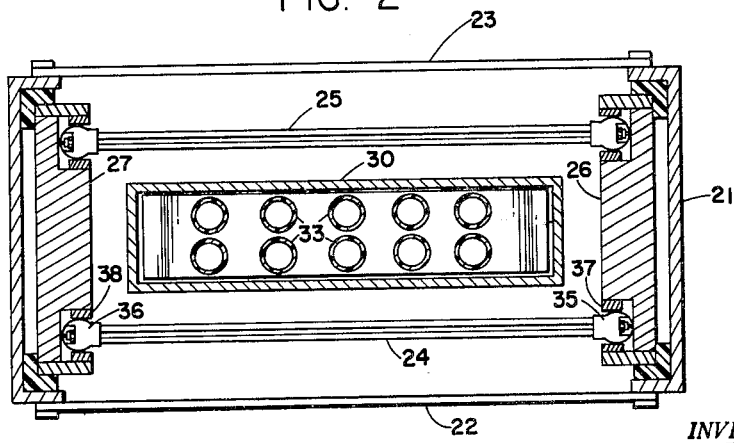
FIGURE 2 shows a cross section view of the transducer of FIGURE 1.

Referring to FIGURES 1 and 2, there is shown a transducer 20 having a transducer housing or frame 21, and further having a pair of front and back acoustically transparent cover plates or windows 22 and 23 which can be made from any suitable material, such as rubber or flexible steel.

A pair of vibrating members 24 and 25, such as a pair of crystal bender bars, are connected in a substantially parallel spaced apart relationship by means of end supports 26 and 27 which in turn are suitably attached to transducer housing 21. The mounting of vibrating means 24 and 25 is such that they are substantially parallel to one another and to the flexible cover plates 22 and 23. A flexible or acoustically transparent free flooding chamber 30 is positioned in the space between vibrating members 24 and 25. A plurality of holes 31 in the bottom of the transducer allows the free flooding chamber 30 to fill with water when the transducer is submerged. A plurality of gas filled complaint tubes 33 are mounted inside of the free flooding chamber 30 and are held in position by means of a lower support bracket 34 and an upper support bracket not shown. The space between cover plates 22 and 23 and the free-flooding chamber 30 is filled with a liquid having an acoustic impedance substantially the same as sea water, for example, silicone oil.

The ends of vibrating member 24 are connected by means of an epoxy or other suitable bonding agent 39, to a pair of end members 35 and 36, which in turn are mounted in a pair of socket members 37 and 38. Socket members 37 and 38 allow end members 35 and 36 to rotate when the vibrating member vibrates, and also allows the end members to move linearly in the longitudinal direction of the vibrating member. This linear longitudinal motion is necessary since as the vibrating member vibrates, or flexes, the distance between its end points decreases. The vibrating member and its bearing mounting means will be explained more fully in the explanation of FIGURES 3, 4 and 5.

Figures 3, 4:
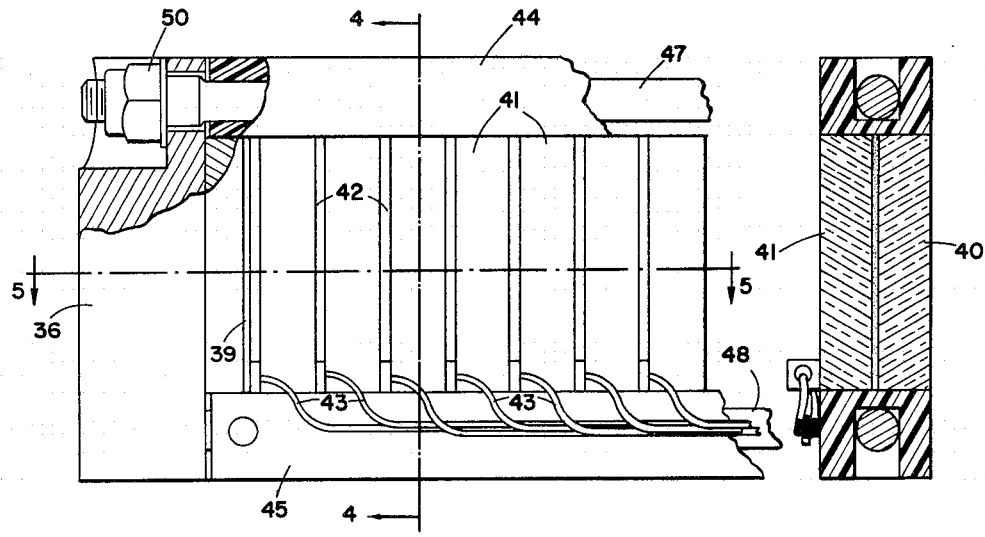
FIGURE 3 shows a partial elevation portion of the vibrating member with parts cut away.
FIGURE 4 shows a section view of the vibrating member of FIGURE 3.

Referring to FIGURES 3 and 4 there is shown first and second polarized crystals, such as polarized barium titanate crystals, 40 and 41, each having two major surfaces and two minor surfaces. Crystals 40 and 41 are bonded together by means of a nonconducting adhesive so as to have major surfaces contiguous. These back-to-back bonded crystal pairs form a crystal module. A plurality of these crystal modules are connected in a row by bonding each crystal module, by means of a conductive adhesive, to a suitable conducting insert, such as a beryllium copper insert, 42 between each module, the minor surfaces of the crystals being bonded to the insert. An electric field is applied to each of the crystal modules by means of conductors 43 connected to the inserts. The crystals 40 and 41 in each crystal pair are polarized in opposite directions, so that when an electric field is applied to the crystals one of the crystals will expand while the other crystal will contract. Referring to FIGURES 3 and 4 it can be seen that if, when an electric field is applied, all of the crystals 41 expand in the longitudinal direction of the bar, while all of the crystals 40 contract in the longitudinal direction of the bar, the bar will bend, or flex. When the electric fields to the crystal pairs are reversed, the bender bar will flex in the opposite direction. A more detailed description of the bender bar, or vibrating member, can be found in a co-pending application of Alvin W. Elston and Gordon A. Vincent, Serial No. 156,209 filed December 1, 1961, now Patent No. 3,127,527 and assigned to the same assignee as the present invention.

A pair of guide rails 44 and 45 are respectively bonded to the longitudinal edges of the crystal bar. Guide rails 44 and 45 can be made from any suitable material such as epoxy bonded fiberglass. Elongated end member 36, having a substantially bulb-shaped cross section, is positioned at the end of the crystal beam and is held in position by means of a pair of external stress rods 47 and 48, stress rod 47 passing through end member 36 and guide rail 44, and stress rod 48 passing through end member 36 and guide rail 45. If desired, said member 36 can be bonded to the end of the crystal beam by means of an epoxy or other suitable bonding material 39. A similar end member 35 (see FIGURE 2) is connected to the other end of the crystal beam. End members 36 and 35 are held in position by suitable means such as adjusting nut 50.

Figure 5:
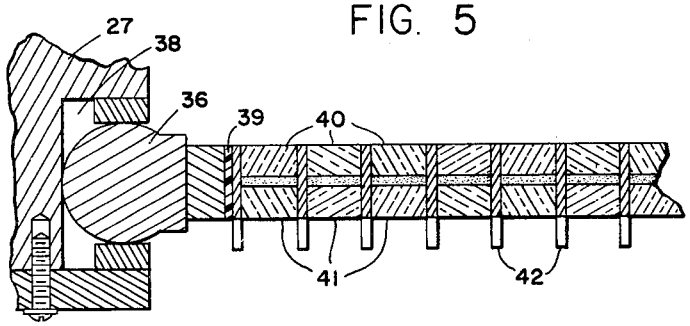
FIGURE 5 shows a section view of the vibrating member of FIGURE 3 and in addition shows a section view of a socket for supporting the vibrating member.

Referring to FIGURE 5 there is shown, in cross section, a hinge, or bearing arrangement for connecting the bender bar to an end support member 27. Bender bar end member 36 is mounted in a substantially C shaped socket member 38 of end support 27. Socket member 38 allows end member 36 to rotate when the bender bar flexes and also allows the end member to move linearly in the longitudinal direction of the bender bar. A similar end support bracket 26 (see FIGURE 2) is connected to the other end of the bender bar.

Referring again to FIGURES 1 and 2, the operation of the transducer is as follows. As the transducer is lowered in the water, the free flooding chamber 30 fills with water through holes 31 in the transducer bottom, and equalizes the internal and external pressures on the transducer.

When the transducer is transmitting, the vibrating members 24 and 25 operate in unison, that is, they either move in an outward direction or an inward direction at the same time. As either of the vibrating members vibrates, it creates a positive and negative pressure wave of equal amplitude. For instance, as vibrating member 24 moves in an outward direction it creates a positive pressure wave in the surrounding water while, at the same time, it creates a negative pressure wave in the free flooding chamber 30. Since the wave length of sound is long compared to the physical dimensions of the source, these pressure waves would cancel and no radiation would result. To prevent this, a pressure relief surface is required in the free flooding region 30 between opposing transducer faces. This is accomplished by the use of sealed, air filled, or gas filled compliant tubes 33. As the vibrating member vibrates, the compliant tubes 33 either expand or contract, depending upon the direction of movement of the vibrating member, and immediately relieve the pressure wave, which the transducer movement tends to set up in the free flooding chamber 30.

It is to be understood that while we have shown a specific embodiment of our invention that it is for the purpose of illustration only, and that our invention is to be limited solely by the scope of the appended claims.

What is claimed is:

1. A transducer comprising: a first flexible ceramic beam and a second flexible ceramic beam, each of said beams being formed from a plurality of individual ceramic elements which produce a mechanical strain when an electrical stress is applied, said elements arranged in two contiguous rows, said elements within said rows further being positioned in contiguous relationship; bearing means positioned at opposite ends of each of said first and second ceramic beams; a fastening means for each of said beams, said fastening means being so arranged with each beam so as to hold said bearing means to said beam; end support means, said end support means being adapted to cooperate with said bearing means of said first and second ceramic beams so as to permit said beams to flex when electrically stressed and further holding said beams in spaced parallel relationship; and compliant means, said compliant means being inserted in said space between said first and second ceramic beams and being formed so as to enclose a gas filled chamber.

2. A transducer comprising: a first flexible ceramic beam and a second flexible ceramic beam, each of said beams being formed from a plurality of individual ceramic elements which produce a mechanical strain when an electrical stress is applied, said elements being arranged in two contiguous rows, said elements within said rows further being positioned in contiguous relationship; bearing means mounted at opposite ends of each of said first and second ceramic beams; a stress member for each of said beams, said stress member being arranged with each beam so as to hold said bearing means to said beam and to apply a compressive force to said ceramic elements; end support means, said end support means holding said bearing means of said first and second ceramic beam so as to permit said beams to flex when electrically stressed and further holding said beams in spaced parallel relationship; and compliant means, said compliant means being inserted in said space between said first and second ceramic beam.

3. A transducer comprising: a plurality of flexible ceramic beams, each of said beams being formed from a plurality of individual ceramic elements which produce a mechanical strain when an electrical stress is applied, said elements being arranged in two contiguous rows, said elements within said rows further being positioned in contiguous relationship; bearing means mounted at opposite ends of each of said plurality of ceramic beams; fastening means for each of said beams, said fastening means being arranged with each beam so as to affix said bearing means to said beam; end support means, said end support means holding said bearing means so as to permit said beams to flex when electrically stressed, said end support means further holding said plurality of first ceramic beams in a first plane when said first ceramic beams are in an unflexed position and said plurality of second ceramic beams in a second plane when said second ceramic beams are in an unflexed position spaced from said first plane; and compliant means, said compliant means being inserted in said space between said first and second plane.

4. A transducer comprising: a plurality of flexible ceramic beams each of said beams being formed from a plurality of individual piezoelectric elements having electrodes associated therewith and being arranged in two contiguous rows, said elements within said rows further being positioned in contiguous relationship; bearing means mounted at opposite ends of each of said plurality of ceramic beams; fastening means for each of said beams, said fastening means being arranged with each beam so as to affix said bearing means to said beam; end support means, said end support means holding said bearing means to permit said beams to flex, said end support means further holding said plurality of first ceramic beams in a first plane when said plurality of first ceramic beams are in an unflexed position and said plurality of second ceramic beams in a second plane spaced from said first plane when said plurality of second ceramic means are in an unflexed position; and compliant means enclosing a gas filled chamber and further being adapted so as to be inserted in said space between said first and second plane.

5. A transducer comprising: a plurality of flexible ceramic beams each of said beams being formed from a plurality of individual piezoelectric elements having electrodes associated therewith and arranged in two contiguous rows, said elements within said rows further being positioned in contiguous relationship; bearing means mounted at opposite ends of each of said plurality of ceramic beams; a pair of stress rods for each of said beams, said rods holding said bearing means to said beam and further applying a compressive force to said ceramic elements; end support means, said end support means holding said bearing means so as to permit said beams to flex, said end support means further holding said plurality of first ceramic beams in a first plane when said plurality of first ceramic beams are in an unflexed position and said plurality of second ceramic beams in a second plane spaced from said first plane when said plurality of second ceramic beams are in an unflexed position; and compliant means inserted in said space between said first and second plane.

6. A transducer comprising: a plurality of flexible ceramic beams, each of said beams being formed from a plurality of individual ceramic elements which produce a mechanical strain when an electrical stress is applied, said elements being arranged in two contiguous rows, said elements within said rows further being positioned in contiguous relationship, said beams having bearing means affixed thereto; stress rod means for each of said beams, said stress rod means holding said beams and applying a compressive force to said ceramic elements; end support members, said end support members holding said bearing means so as to permit said beams to flex when electrically stressed, said end support members further holding said plurality of first ceramic beams in a first plane and said plurality of second ceramic beams in a second plane spaced from said first plane said first and second planes being defined by the unflexed positions of said plurality of first and second ceramic beams respectively; and compliant means, said compliant means being inserted in said space between said first and second plane.

7. A transducer comprising: a plurality of flexible ceramic beams each of said beams being formed from a plurality of individual ceramic elements which produce a mechanical strain when an electrical stress is applied, said elements being arranged in two contiguous rows, said elements within said rows further being positioned in contiguous relationship, said beams each having bearing means at opposite ends; a pair of stress rods for each of said beams; a pair of guide channels for each of said beams, each of said guide channels being individually bonded to opposite longitudinal edges of said beam and adapted with each of said rods to insulate said rods from said elements, said rods holding said bearing means to said beam and applying a compressive force to said ceramic elements; end support members holding said bearing means to permit said beams to flex, said end support members further holding said plurality of first ceramic beams in a first plane and said plurality of second ceramic beams in a second plane spaced from said first plane said first and second planes being defined by the unflexed positions of said plurality of first and second ceramic beams respectively; and compliant means inserted in said space between said first and second plane and so formed to enclose a gas filled chamber.

8. A transducer comprising: a housing having a first flexible cover on one surface thereof and a second flexible cover on an opposite surface thereof; a first vibrating member and a second vibrating member; means mounting said first vibrating member and said second vibrating member in a substantially parallel spaced apart relationship within said housing, said first vibrating member being adjacent said first cover and said second vibrating member being adjacent said second cover; a free flooding chamber mounted in said housing between said first and second vibrating members; a substantially noncompressible fluid in said housing between said first and second covers and said free flooding chamber; and a plurality of compliant gas filled tubes mounted inside of said free flooding chamber.

9. A transducer comprising: a housing; a flexible cover for said housing; a vibrating member having at least two surfaces; means mounting said vibrating member in said housing, one surface of said vibrating member being adjacent said flexible cover; a free flooding chamber mounted within said housing adjacent an opposite surface of said vibrating member; a substantially noncompressible fluid in said housing between said flexible cover and said free flooding chamber; and a plurality of compliant gas filled tubes mounted inside of said free flooding chamber.

10. A transducer comprising: a housing having an acoustically transparent window; a flexible ceramic beam, said beam being formed from a plurality of individual ceramic elements which produce a mechanical strain when an electrical stress is applied, said elements being arranged in two contiguous rows, said elements within said rows further being positioned in contiguous relationship, said beam having bearing means at opposite ends; a pair of guide channels for said beam, each of said guide channels being individually bonded to opposite longitudinal edges of said beam; a pair of stress rods, one of said stress rods lying in each of said guide channels and holding said bearing means to said beam, said stress rods applying a compressive force to said ceramic elements; end support means mounted in said housing and supporting the bearing means of said ceramic beam, said end support means holding the ceramic beam adjacent said acoustically transparent window; a free flooding chamber mounted in said housing; a substantially noncompressible fluid in said housing between said acoustic window and said free flooding chamber; and a plurality of compliant gas filled tubes mounted inside of said free flooding chamber.

References Cited by the Examiner

UNITED STATES PATENTS

| 2,374,637 | 4/1945 | Hayes | 340—8 |
| 2,429,104 | 10/1947 | Olson | 340—8 |
| 2,903,673 | 9/1959 | Harris | 340—8 |
| 2,928,409 | 3/1960 | Johnson et al. | 340—8 |
| 2,977,573 | 3/1961 | Mott | 340—8 |
| 2,978,672 | 4/1961 | Barney | 340—14 |
| 3,002,179 | 9/1961 | Kuester | 340—10 |
| 3,048,815 | 8/1962 | Thurston et al. | 340—10 |

CHESTER L. JUSTUS, *Primary Examiner.*

C. F. ROBERTS, G. M. FISHER, *Assistant Examiners.*